3,062,694
PROPELLANT EXTRUSION AID
Boyce M. Corley and Otho D. Ratliff, McGregor, Tex., assignors to Phillips Petroleum Company, a corporation of Delaware
No Drawing. Filed May 14, 1959, Ser. No. 813,310
8 Claims. (Cl. 149—19)

This invention relates to solid propellant compositions. In one aspect, this invention relates to a novel extrusion aid for difficultly extrudable propellant compositions. In another aspect, this invention relates to novel solid propellant compositions having improved extrusion characteristics.

In our copending application, Serial No. 753,160, filed August 4, 1958, now Patent No. 2,995,432, issued on August 8, 1961, we have disclosed and claimed novel propellant compositions having ballistic properties which render these compositions particularly useful in certain applications such as small missiles, stationary gas generators and in other applications where outstanding mechanical properties of the solid propellant are not required. In our copending application, we describe a solid propellant composition comprising a solid inorganic oxidizing salt; a binder component comprising a copolymer of a conjugated diene with a heterocyclic nitrogen base; and an uncured thermosetting resinous condensate of an aldehyde with another compound such as a phenolic compound, urea, or melamine.

The thermosetting resins employed as reinforcing agents according to the above copending application, instead of reinforcing agents customarily used such as carbon black, can be any of the well known classes of resins produced by condensing any aldehydic compound with any phenolic compound, with urea, or with melamine. These classes of resins are well known to those skilled in the art. Suitable aldehydes include, among others, formaldehyde, acetaldehyde, propionaldehyde, benzaldehyde, and the like.

The phenolic resins form a presently preferred class of the thermosetting resins for use in the practice of the referred to invention. Examples of phenolic compounds which can be condensed with said aldehydic compounds include, among others, phenol; the ortho, para, and meta cresols; the xylenols; the dihydroxybenzenes, such as resorcinol; and the like. In preparing such phenolic resins, a phenolic compound is condensed with an aldehydic compound, generally in the ratio of about 0.75 to about 3 mols of aldehydic compound for each mol of phenolic compound. A presently preferred resin for use in the practice of the invention is one prepared by condensing phenol with formaldehyde. An example of such resin is Schenectady Resin No. 6601 available commercially from the Schenectady Varnish Company of Schenectady, New York.

The propellant compositions containing a thermosetting resin as reinforcing agent have been found difficult to extrude with a smooth surface. When these compositions are utilized as end-burning grains, the grains must be restricted from burning on the circumferential surface. It has been found difficult to restrict the burning surface if that surface is not smooth. The propellant compositions containing a thermosetting resin often result in extruded rods having a roughened surface resembling fish scales, presumably because of a tendency for the propellant to stick to the die. When attempts are made to avoid this roughened surface by incorporation of the required amounts of liquid plasticizer, the plasticizer can bleed from the composition resulting in a propellant grain having a tacky surface which also presents a problem in attaining a bond between the propellant and the restrictor.

It is an object of the present invention to provide a solid propellant which can be easily extruded into the desired grain form. It is also an object of this invention to provide an extrusion aid for solid propellant compositions including propellant compositions which contain a thermosetting resin as reinforcing agent for said propellant composition. Still another object of this invention is the provision of a method for facilitating the extrusion of propellant compositions containing therein a thermosetting resin as a component part thereof. Other objects and advantages will be apparent to one skilled in the art upon study of this disclosure and the detailed description of the invention.

Broadly, the invention contemplates adding cracked solid polyethylene to a solid propellant composition to improve the processability characteristics of the propellant composition, particularly with respect to extrusion of the propellant. The cracked polyethylene extrusion aid of this invention has utility in the extrusion of any solid propellant composition comprising a solid inorganic oxidizing salt and a binder component comprising a copolymer of a conjugated diene and a heterocyclic nitrogen base, but is particularly applicable to such propellant compositions wherein a thermosetting resin is used as a reinforcing agent in the propellant composition.

The rubbery polymers employed as binders in the solid propellant compositions of this invention are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML–4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

In the preparation of the copolymers, the amount of conjugated diene employed is in the range of 75 to 95 parts by weight per 100 parts of monomers and the heterocyclic nitrogen base is in the range of 25 to 5 parts. The conjugated dienes employed are those containing from 4 to 10 carbon atoms per molecule and including 1,3-butadiene, isoprene, 2-methyl-1,3-butadiene, 2,3-dimethyl-1,3-butadiene, 2-methoxybutadiene, 2-phenylbutadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the preparation of the polymeric binders of this invention. Furthermore, instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one

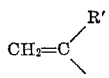

substituent wherein R' is either hydrogen or a methyl group. That is, the substituent is either a vinyl or an alpha-methylvinyl (isopropenyl) group. Of these, the compounds of the pyridine series are at present of the greatest interest commercially. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

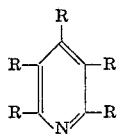

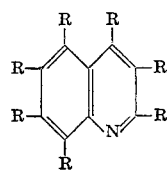

or

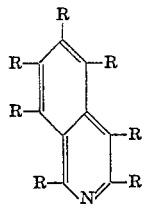

where R is selected from the group consisting of hydrogen, alkyl, vinyl, alpha-methylvinyl, alkoxy, halo, hydroxy, cyano, aryloxy, aryl, and combination of these groups such as haloalkyl alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyrdine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl) pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl) pyridine; 3-vinyl-5-phenylpyridine; 2-(para-methylvinyl) - 3 - vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The binder component contains rubbery polymers of the type hereinbefore described, a reinforcing agent of the type described; and in addition, there can be present one or more plasticizers, wetting agents, and antioxidants. Other ingredients which are employed for sulfur vulcanization include a vulcanization accelerator, a vulcanizing agent such as sulfur, and an accelerator activator, such as zinc oxide. The finished binder usually contains various compounding ingredients. Thus, it will be understood that herein and in the claims unless otherwise specified, the term "binder" is employed generically and includes various conventional compounding ingredients. The binder content of the propellant composition will usually range from 4 to 25 percent by weight of the total composition.

The rubbery copolymer comprising a conjugated diene and a polymerizable heterocyclic nitrogen base can also be cured by a quaternization reaction by incorporating therein a quaternizing agent and subjecting the resulting mixture to quaternization conditions of temperature. Thus, the binder component can also contain a quaternizing agent. Suitable quaternizing agents include, among others, the following: alkyl halides such as methyl iodide, and methyl bromide; alkylene halides such as methylene iodide, and ethylene bromide; substituted alkanes such as chloroform, bromoform, and alkyl sulfates such as methyl sulfate; and various substituted aromatic compounds such as benzoyl chloride, methyl benzene sulfonate, benzo-trichloride, benzyl chloride, benzal chloride, paraxylene-hexachloride, and the like. The quaternizing temperature is usually in the range from 0 to 250° F., although temperatures outside this range can be used.

A general formulation for the binder component of the propellant composition of the invention is as follows.

| Ingredient: | Parts by weight |
|---|---|
| Bd/MVP copolymer | 100 |
| Reinforcing agent | 10–60 |
| Extender oil | 20–50 |
| In addition other ingredients can be included as follows: | |
| Plasticizer | 0–200 |
| Wetting agent | 0–10 |
| Antioxidant | 0–3 |
| Vulcanization accelerator | 0–5 |
| Sulfur | 0–2 |
| Quaternizing agent | 0–25 |
| Metal oxide | 0–5 |

In general, any rubber plasticizer can be employed in the binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), di(1,4,7-trioxaundecyl) methane, and dioctyl phthalate are suitable plasticizers. Materials which provide a rubber having good low temperature properties are preferred. It is also frequently preferred that the plasticizers be oxygen-containing materials.

One presently preferred plasticizer is a liquid polybutadiene prepared by mass polymerization in the presence of finely divided sodium as the catalyst according to the method of Crouch 2,631,175. Broadly, such plasticizers which can be used in accordance with this invention comprise liquid polymers prepared from conjugated diolefin hydrocarbons such as 1,3-butadiene and isoprene, the liquid polymers having a viscosity of 100 to 5000 Saybolt Furol seconds at 100° F. Polymers having a viscosity from about 1000 to about 2500 Saybolt Furol seconds are presently preferred. These liquid polymers can be prepared by emulsion polymerization using large amounts of modifiers in accordance with the teaching of Frolich et al. 2,500,983 although they are preferably prepared by the method set forth in Crouch 2,631,175. The latter method comprises mass polymerization in the presence of finely divided alkali metal and/or alkali metal hydride such as sodium, potassium, lithium, sodium hydride, potassium hydride and lithium hydride. Polymers thus prepared contain no modifiers or viscosity controlling agent and they are also free of materials which would act as inhibitors such as antioxidants and shortstops. Finely divided catalyst is used, preferably having a particle size below 200 microns, and generally below 100 microns in the range of 40 to 80 microns. The amount of catalyst employed usually does not exceed 2 parts by weight of the total monomer charged, preferably in the range of 0.5 to 1.5 parts by weight per 100 parts monomer. A more complete description of the process is set forth in the Crouch patent identified above.

Another essential ingredient for use in the propellant compositions of the invention is an extended oil such as Philrich 5, a rubber extender and process oil available commercially from Phillips Petroleum Company. Said Philrich 5 is a highly aromatic heavy petroleum residual oil. Typical tests on said Philrich 5 are:

| | |
|---|---|
| Gravity, ° API | 11.6 |
| Viscosity, SUV, @ 210° F. | 175 |
| Aniline point, ° F. | 110 |
| Rostler analysis, wt. percent, (I.E.C. 41, 598 [1949]): | |
| Asphaltenes | 0.0 |
| Nitrogen bases | 11.0 |
| First acidaffins | 19.0 |
| Second acidaffins | 61.0 |
| Paraffins | 9.0 |

Wetting agents aid in deflocculating or dispersing the oxidizer. Aerosel OT (dioctyl ester of sodium sulfosuccinic acid), lecithin, and Duomeen C diacetate (the diacetate of trimethylenediamine substituted by a coconut oil product) are among the materials which are applicable.

Antioxidants which can be employed include Flaxamine (physical mixture containing 65 percent of a complex diarylamine-ketone reaction product and 35 percent of N,N'-diphenyl-p-phenylenediamine), phenyl-beta - naphthylamine, 2,2-methylene-bis(4-methyl-6 - tert - butylphenol), and the like. Rubber antioxidants, in general, can be employed or if desired can be omitted.

Examples of vulcanization accelerators are those of the carbamate type, such as N,N-dimethyl-S-tert-butylsulfenyl dithiocarbamate and Butyl-Eight. Butyl-Eight is a rubber accelerator of the dithiocarbamate type supplied by the R. F. Vanderbilt Company and described in "Handbook of Material Trade Names," by Zimmerman and Lavine, 1953 edition, as a brown liquid; specific gravity 1.01; partially soluble in water and gasoline; and soluble in acetone, alcohol, benzol, carbon disulfide and chloroform.

It is to be understood that each of the various types of compounding ingredients can be used singly or mixtures of various ingredients performing a certain function can be employed. It is sometimes preferred, for example, to use mixtures of plasticizers rather than a single material.

Oxidizers which are applicable in the solid propellant compositions of this invention are those oxygen-containing solids which readily give up oxygen and include, for example, ammonium, alkali metal, and alkaline earth metal salts of nitric, perchloric, and chloric acids, and mixtures thereof. Ammonium nitrate and ammonium perchlorate are the preferred oxidizers for use in the solid propellants of this invention. Other specific oxidizers include sodium nitrate, potassium, perchlorate, lithium chlorate, calcium nitrate, barium perchlorate, and strontium chlorate. Mixtures of oxidizers are also applicable. In the preparation of the solid rocket propellant compositions, the oxidizers are ground to a particle size, preferably within the range between 20 and 200 microns average particle size. The most preferred particle size is from 40–60 microns. The amount of solid oxidizer used is a major amount of the total composition and is in the range of 75 to 96 percent by weight of the total propellant composition.

When ammonium nitrate is used as the oxidant component, a phase stabilized ammonium nitrate is frequently used. One method of phase stabilizing ammonium nitrate is to admix about 10 parts of a potassium salt (usually potassium nitrate) with about 90 parts of ammonium nitrate, along with some water, heating the mixture to about 140° F., dry, and then grind to the desired particle size.

It is also within the scope of the invention to employ organic oxidizing salts as a portion of the oxidizer component. Examples of said organic oxidizing salts include, among others, cyanoguanadine, nitroguanadine, and guanadine nitrate. Said organic oxidizing salts function as a burning rate depressant when used in conjunction with the solid inorganic oxidizing salts. Said organic oxidizing salt can comprise from 5 to 15 weight percent of the total propellant composition. The organic oxidizing salt replaces a like amount of the inorganic oxidizing salt. Thus, the total amount of solid oxidizing salt in the propellant composition remains within the range 75 to 96 weight percent of the total composition.

In some instances it is desirable to employ a burning rate catalyst in the propellant compositions of the invention. Any suitable burning rate catalyst can be used in the propellant compositions of the invention. Burning rate catalysts applicable in the invention include ammonium dichromate and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide (Turnbull's blue) is also applicable. A particularly effective burning rate catalyst is Milori blue which is pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used in the propellant compositions of the invention can be within the range of 0 to 12 weight percent, preferably within the range of 0 to 5 weight percent of the total composition.

The various ingredients in the propellant composition can be mixed on a roll mill, or an internal mixer such as a Banbury or a Baker-Perkins mixer can be employed. It is usually desirable to carry out the mixing or the incorporation of the thermosetting resin into the copolymer at elevated temperatures of the order of 170 to 190° F. in order that the resin can be smoothly and stably incorporated into the copolymer. The temperature at which said mixing is carried out should be below the temperature at which curing or thermosetting of the copolymer and/or the thermosetting resin will occur during the time the mixing is being carried out. One convenient procedure for blending the propellant ingredients is to mill the copolymer initially on a cold roll mill for a few minutes in order to break it down and then introduce the resinous material into the working bank of the copolymer on the mill to form an even mixture. After said mixture is formed, the temperature of the rolls of the mill is raised to about 170 to 190° F. and the resinous material is smoothly and stably incorporated into the copolymer. The remainder of the ingredients of the propellant composition can then be added to the mixture in any suitable manner. One convenient method is to mix in the remainder of the binder ingredients and then incorporate the oxidizer component, burning rate catalyst, etc., either as the remainder of said binder ingredients are being incorporated into the copolymer-resin blend, or after all of the binder ingredients have been mixed in. In the finished propellant, the binder component forms a continuous phase with the oxidizer component as a discontinuous phase. As mentioned above, the mixing or milling operation can be carried out employing types of mills other than roll mills, such as Baker-Perkins mixers, Banbury mixers, and the like, provided, of course, that heat be supplied at some time during the milling or mixing operation.

After mixing of the propellant ingredients has been carried out as described above, the composition can be compression molded or extruded into any desired shape or configuration. The grains or propellant are then cured. The curing temperature will be limited by the oxidizer in some instances but will generally be in the range between 70 and 240° F. Curing can be effected at atmospheric pressure or at superatmospheric pressures. It is usually preferred to cure at about atmospheric pressure.

The extrusion aid of this invention comprises the product of the thermocracking of high molecular weight linear polymers of ethylene. The high molecular weight polymers which are cracked to produce the extrusion aid of this invention can be produced by processes disclosed in U.S. Patent 2,825,721 issued to J. P. Hogan et al. on March 4, 1958. In brief, this process comprises contacting a 1-olefin including ethylene in the range of 150 to 450° F. with a catalyst comprising as its essential ingredient from 0.1 to 10 or more weight percent of chromium in the form of chromium oxide, including a substantial portion of hexavalent chromium associated with at least one additional oxide selected from the group consisting of silica, alumina, zirconia, and thoria. The polymerization reaction normally is carried out with the monomeric olefin in solution in the hydrocarbon solvent, such as a paraffin or naphthene which is liquid under the polymerization conditions. A pressure of at least 100 to 300 p.s.i. is generally desired and a pressure up around 500 p.s.i. is often preferred. Other methods of producing polymers having the desired characteristics can also be employed.

A controlled cracking process comprises heating such a polymer in an inert atmosphere, such as nitrogen, at about atmospheric pressure, and at an internal temperature of the polymer in the range of between about 600 and about 900° F., for a time in the range of about 1 minute to about 30 minutes to produce a product having a molecular weight of about 900 to about 3000 or higher, such as about 10,000 as determined by the boiling point method using tetrachloroethylene as the solvent.

The controlled cracking of the polymer is preferably operated as a continuous process by introducing the polymer at one end of a long tubular cracking zone provided with a suitable heating means and extruding the product at the opposite end. The temperature and residence time control the type of product obtained. The longer the heat is applied and the higher the temperature, the lower is the molecular weight of the product.

One method for the thermocracking of the polyethylene is described in greater detail in copending application, Serial No. 556,471, filed December 30, 1955, by P. J. Canterino et al. The cracked polyethylene to be used as extrusion aid according to the present invention ordinarily will have a molecular weight in the range of about 900 to about 10,000 as determined by the boiling point method using tetrachloroethylene as the solvent.

The extrusion aid of the invention will be preferably employed in an amount of about 10 to about 50 parts by weight per 100 parts of copolymer and more preferably in the range of about 20 to 40 parts to obtain the maximum benefits of extrusion pressure reduction and extrusion rate.

The amount of aromatic hydrocarbon extender oil to be used with the extrusion aid will be the amount required to soften the polyethylene for incorporation into the binder composition.

The following example will serve further to illustrate the invention but is not to be construed as limiting the invention.

*Example*

Propellant compositions were prepared using a copolymer of 85 parts by weight of 1,3-butadiene and 15 parts by weight of 2-methyl-5-vinylpyridine, together with the other ingredients shown below. The binder components were intimately mixed, after which the ammonium nitrate oxidizer was incorporated into the binder and the resulting compositions were extruded and cured as hereinafter described.

| Ingredient | Parts per 100 Parts Copolymer | | Weight Percent |
|---|---|---|---|
| | A | B | |
| Binder Component: | | | |
| Copolymer | 100 | 100 | |
| Schenectady Resin No. 6601 [1] | 44 | 44 | |
| Polygard [2] | 14 | 14 | |
| Butarez [3] | 100 | 100 | 15.00 |
| Philrich [4] | 40 | 40 | |
| p-Xylene Cl$_2$ | 6 | 6 | |
| Cracked Polyethylene [5] | 20 | 40 | |
| Oxidizer Component: | | | |
| Ammonium Nitrate | | | 85.00 |
| | | | 100.00 |

[1] A trademark for an uncured phenol-formaldehyde resin available commercially from the Schenectady Varnish Company, Schenectady, New York.
[2] A trademark for an alkylated aryl phosphite.
[3] A trademark for liquid polybutadiene having a viscosity of about 250 seconds at 100° F. available from Phillips Petroleum Company, Bartlesville, Oklahoma.
[4] A trademark for a highly aromatic hydrocarbon oil available from Phillips Petroleum Company, Bartlesville, Oklahoma.
[5] Ethylene polymerized in the presence of a chromium oxide-silica-alumina catalyst (2.5 weight percent chromium as chromium oxide) using cyclohexane as solvent at a temperature of about 280° F. and a pressure of about 420 p.s.i.g. The solid ethylene polymer was heated rapidly to about 700° F. and maintained at that temperature for about 2 minutes.

After sufficient mixing to incorporate the ammonium nitrate thoroughly into the binder composition the resulting propellant compositions were extruded from a hydraulic operated, piston-type extrusion press into 2-inch rods. The extrusion data are shown in the following tabulation:

| | Without Cracked Polyethylene | With Cracked Polyethylene | |
|---|---|---|---|
| | | A | B |
| Extrusion Pressure, p.s.i. | 24,000 | 12,500 | 16,000. |
| Extrusion Rate, in./sec. | 0.197 | 2.00 | 3.00. |
| Appearance | Fish-scaled | Smooth | Smooth. |

Burning rates of $\frac{3}{16}$-inch strands at 500 p.s.i. were 0.038 and 0.042 inch per second which is comparable to the burning rate of 0.048 inch per second for the propellant composition without the cracked polyethylene.

While the invention has been described with respect to cracked linear polyethylene, it is not limited to the cracked product but includes any solid polyethylene having a molecular weight greater than about 900. The molecular weight of the polyethylene can be as high as 500,000, preferably as high as about 100,000. The molecular weight of the polymers of ethylene, e.g., up to about 10,000, can be determined by the boiling point method hereinbefore described. The molecular weight of ethylene polymers having a molecular weight greater than about 10,000 can be identified by the following method.

Determine the relative viscosity ($\text{Vis}_r$) of the polymer in tetralin at 130° C. employing a concentration of 0.183 gram of polymer per 100 milliliters of tetralin. The molecular weight is then calculated using the formula $$M_w = \frac{2.445 \times 10^4 \cdot 2.303 \cdot \log \text{Vis}_r}{0.183}$$

$$\text{Vis}_r = \frac{\text{Solution flow time in seconds}}{\text{Solvent flow time in seconds}}$$

Reasonable variations and modifications are possible within the scope of the present disclosure without departing from the spirit and scope of the invention.

That which is claimed is:

1. A solid propellant composition consisting essentially of about 75 to about 96 weight percent of a solid inorganic oxidizing salt; about 4 to about 25 weight percent of a binder comprising a rubbery copolymer of a conjugated diene containing from 4 to 8 carbon atoms per molecule with a

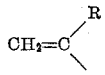

substituted heterocyclic nitrogen base selected from the group consisting of pyridine, quinoline, an alkyl substituted pyridine, and an alkyl substituted quinoline wherein the total number of carbon atoms in the nuclear alkyl substituents is not more than 15, and wherein R is selected from the group consisting of hydrogen and a methyl radical, containing about 10 to about 60 parts per 100 by weight of copolymer of an uncured thermosetting resinous condensate of an aldehyde with a compound selected from the group consisting of phenol, the cresols, the xylenols, resorcinol, urea, melamine and mixtures thereof; about 20 to about 50 parts by weight per 100 parts of copolymer of a rubber extender oil; and about 20 to about 40 parts by weight per 100 parts of copolymer of a thermally cracked polyethylene having a molecular weight about 900 to 500,000 as an extrusion aid for the propellant composition.

2. The composition of claim 1 wherein said resinous condensate is a phenol-formaldehyde resin and said thermally cracked polyethylene is the product of pyrolysis of polyethylene produced by the polymerization of ethylene in the presence of liquid cyclohexane and catalyst comprising chromium oxide, containing a substantial amount of hexavalent chromium, associated with silica and alumina.

3. The composition of claim 1 wherein said resinous condensate is a urea-formaldehyde resin.

4. The composition of claim 1 wherein said resinous condensate is a melamine-formaldehyde resin.

5. The composition of claim 1 wherein the solid inorganic oxidizing salt is ammonium nitrate, the rubbery copolymer is a copolymer of 1,3-butadiene and 2-methyl-5-vinylpyridine, the resinous condensate is phenolformaldehyde and the cracked polyethylene extrusion aid is the product of pyrolysis of a chromium oxide catalyzed solid polymer.

6. In the process of preparing propellant compositions by extrusion into solid propellant grains wherein a major amount of a solid inorganic oxidizing salt is incorporated into a rubbery binder comprising a copolymer of a conjugated diene and a heterocyclic nitrogen base and containing therein a thermosetting resin reinforcing agent, the improvement which comprises incorporating into said propellant composition from 20 to 50 parts by weight per 100 parts of copolymer of an aromatic-containing extender oil and 20 to about 40 parts by weight per 100 parts of copolymer of a solid polyethylene having a molecular weight of about 900 to 10,000 as an extrusion aid; and extruding the resulting propellant composition into propellant grains.

7. The solid propellant composition of claim 1 wherein the thermally cracked polyethylene has a molecular weight of about 900 to about 10,000.

8. A process for producing a solid propellant composition which comprises admixing a major portion of a solid inorganic oxidizing salt and a minor portion of a rubbery binder consisting essentially of a copolymer of a conjugated diene containing 4 to 8 carbon atoms per molecule with a

substituted heterocyclic nitrogen base selected from the group consisting of pyridine, quinoline, an alkyl substituted pyridine, and an alkyl substituted quinoline wherein the total number of carbon atoms in the nuclear alkyl substituent is not more than 15, and wherein R is selected from the group consisting of hydrogen and a methyl radical and containing therein an uncured thermosetting resin, incorporating about 20 to about 40 parts by weight per 100 parts of copolymer of a cracked polyethylene having a molecular weight of about 900 to about 500,000 as an extrusion aid and about 20 to about 50 parts by weight per 100 parts of a copolymer of a rubber extruder oil into said solid propellant composition; and extruding the resulting propellant composition into propellant grains.

References Cited in the file of this patent

UNITED STATES PATENTS

| | | |
|---|---|---|
| 2,400,091 | Alfthan | May 14, 1946 |
| 2,622,277 | Bonell et al. | Dec. 23, 1952 |
| 2,791,883 | Moore et al. | May 14, 1957 |
| 2,857,258 | Thomas | Oct. 21, 1958 |
| 2,877,504 | Fox | Mar. 17, 1959 |

OTHER REFERENCES

Chem. and Eng. News, October 7, 1957, pages 62 and 63.

Noland: Chemical Engineering, May 19, 1958, pages 154–6.

Zaehringer: Missiles and Rockets, vol. 3, No. 3, March 1958, page 69.